(No Model.) 4 Sheets—Sheet 1.
T. A. EDISON.
JUNCTION BOX FOR ELECTRIC WIRES.
No. 439,391. Patented Oct. 28, 1890.
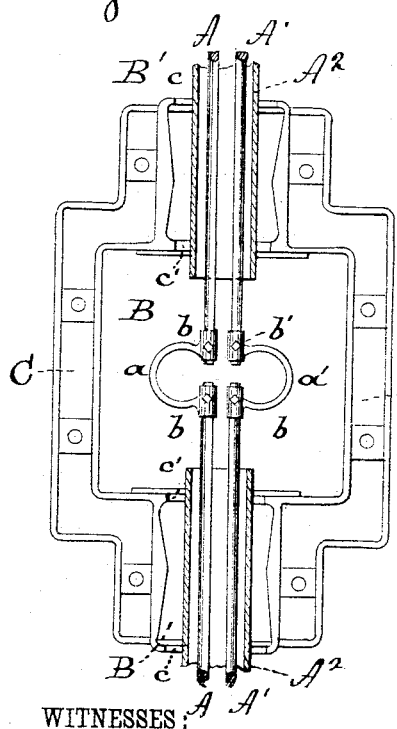
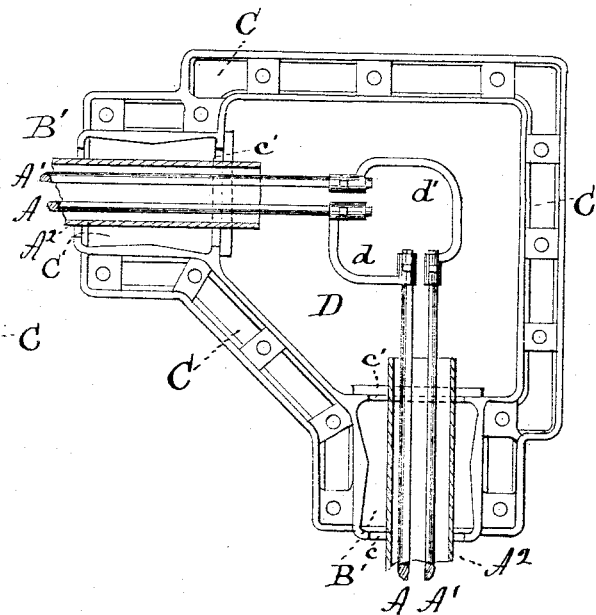
WITNESSES:
O. D. Mott
H. W. Seely
INVENTOR:
T. A. Edison
BY Rich'd N. Dyer
ATTORNEY.

(No Model.) 4 Sheets—Sheet 2.
T. A. EDISON.
JUNCTION BOX FOR ELECTRIC WIRES.
No. 439,391. Patented Oct. 28, 1890.
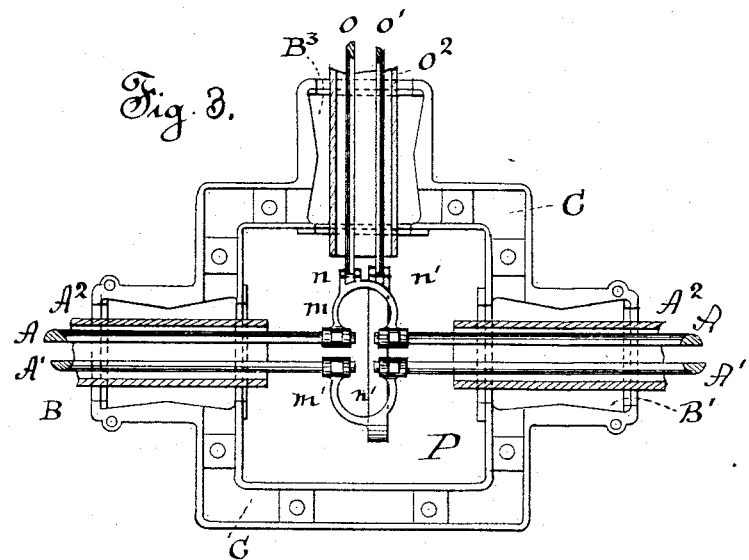
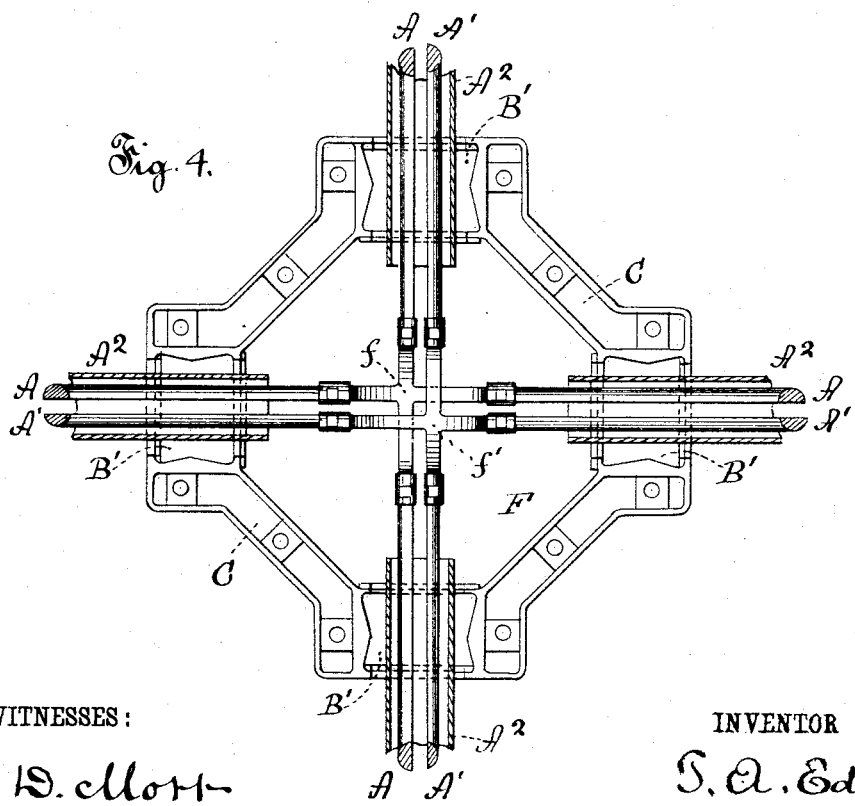
WITNESSES:
O. D. Mott
H. W. Seely
INVENTOR
T. A. Edison
BY Rich'd N. Dyer
ATTORNEY.

(No Model.) 4 Sheets—Sheet 3.

T. A. EDISON.
JUNCTION BOX FOR ELECTRIC WIRES.

No. 439,391. Patented Oct. 28, 1890.

WITNESSES:
D. D. Mott
H. W. Seely

INVENTOR:
T. A. Edison
BY Rich'd N. Dyer,
ATTORNEY.

(No Model.)   4 Sheets—Sheet 4.
T. A. EDISON.
JUNCTION BOX FOR ELECTRIC WIRES.
No. 439,391.   Patented Oct. 28, 1890.
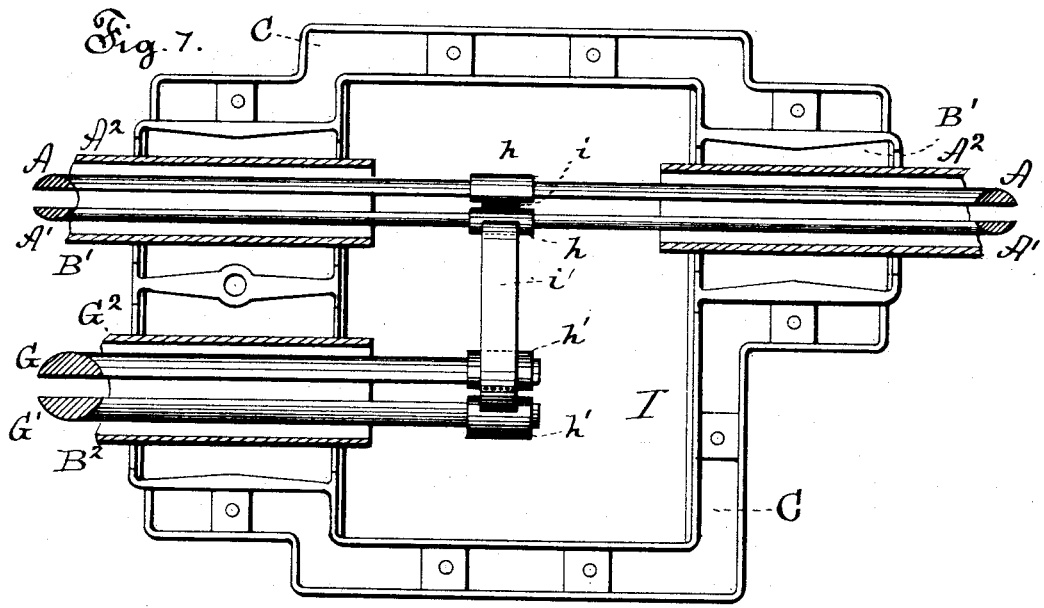
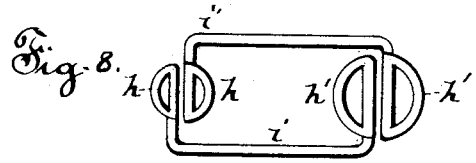
WITNESSES:
INVENTOR:
T. A. Edison
BY Rich'd N. Dyer,
ATTORNEY.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

JUNCTION-BOX FOR ELECTRIC WIRES.

SPECIFICATION forming part of Letters Patent No. 439,391, dated October 28, 1890.

Application filed August 7, 1882. Serial No. 68,604. (No model.)

*To all whom it may concern:*

Be it known that I, THOMAS A. EDISON, of Menlo Park, in the county of Middlesex and State of New Jersey, have invented a new and useful Improvement in Junctions for Conductors of Multiple-Arc Systems of Electrical Distribution; and I do hereby declare that the following is a full and exact description of the same, reference being had to the accompanying drawings, and to the letters of reference marked thereon.

The object I have in view is to produce an efficient means for joining the conductors of my multiple-arc system of electrical distribution so that good contact will be made and the expansion and contraction will be taken up without danger of injuring the connections, and, further, to provide proper inclosing-boxes for such junctions, which boxes in the case of the underground conductors will prevent admission of moisture, and in all cases will protect the conductors where laid bare for making connections and prevent accidental cross-connections between such conductors. I also have in view means for connecting proper "safety-catches" in line with the conductors and for covering and protecting such safety-catches, allowing at the same time convenient access to them for replacement.

My invention consists in the peculiar devices employed by me to accomplish the foregoing, as fully hereinafter explained, and pointed out in the claims.

Figure 5:
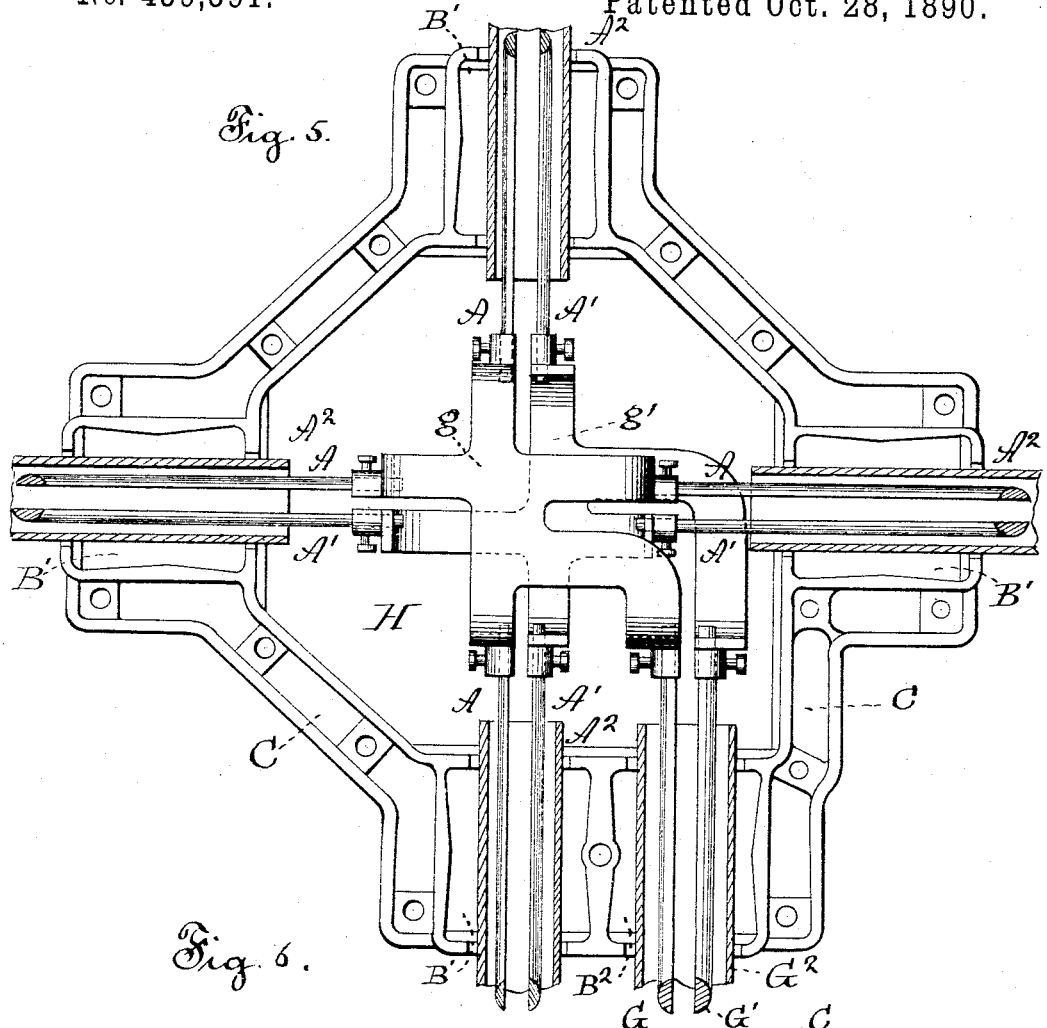
Figure 6:
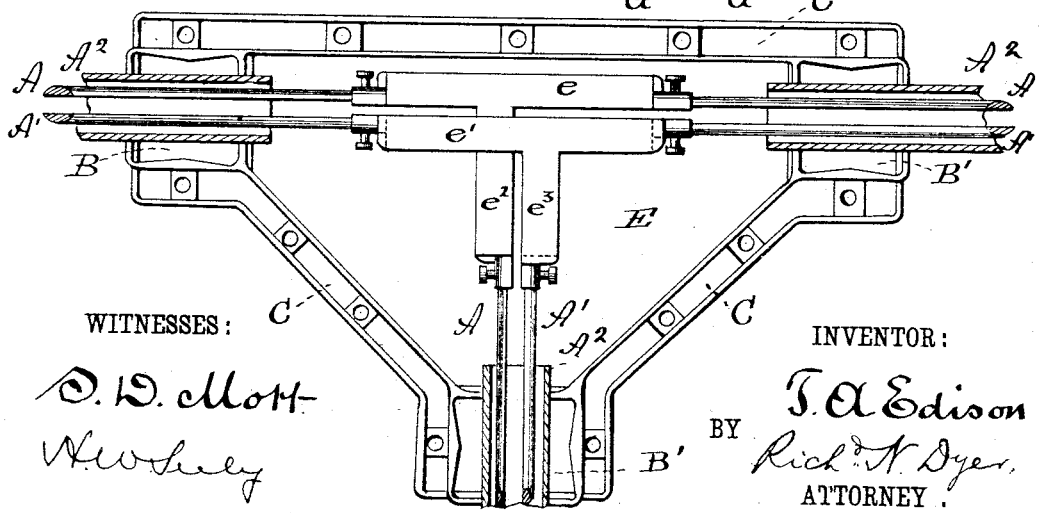

In the drawings, Figure 1 is a top view of a coupling-box with cover removed to show connections. Fig. 2 is a similar view of an elbow-box. Fig. 3 is a similar view of a house-service box. Fig. 4 is a similar view of a cross-box. Fig. 5 is a similar view of a combined cross and feeder box. Fig. 6 is a similar view of a T-box. Fig. 7 is a similar view of a simple feeder-box. Fig. 8 is an elevation of the connecting-pieces used in said simple feeder-box.

The main conductors of my multiple-arc system of electrical distribution are laid underground, like gas and water pipes. For this purpose I prefer to use for each underground circuit copper rods A A', approximately semicircular in cross-section, inclosed in sections $A^2$ of iron tubing, the copper rods being insulated from each other and from the tubing, as described in my patent, No. 251,552, dated December 27, 1881.

The main conductors in one section of tubing are coupled with those of other sections placed in line therewith, Fig. 1, by means of curved or bent pieces $a\ a'$ of copper or an alloy thereof. These bent pieces $a\ a'$ have eyes or sockets $b$ in their ends which receive the bare ends of the conductors A A'. The conductors are soldered in said sockets to make good electrical contact, being first, preferably, tinned on their ends, and are additionally secured by set-screws $b'$. The bent copper pieces $a\ a'$ which I use in some form for all connections of the rigid copper rods, take up the contraction and expansion of the copper conductors. The box for inclosing this simple line-coupling is a square cast-iron box B, having openings at opposite ends, which openings are elongated to form chambers B', having end flanges $c\ c'$. The ends of the sections $A^2$ of tubing rest upon these flanges, the bare copper main conductors projecting beyond the ends of the tubing, as shown.

Washers of pasteboard are placed around the tubing so as to close the ends of chambers B', and such chambers are then filled with asphaltum, tar, or other suitable moisture-excluding material or compound. These chambered openings, which I use with all boxes covering underground connections, prevent the admission of moisture into the boxes, allow the tubing to be readily separated from the boxes when desired, and permit an easy adjustment of the parts in laying. The chambered openings, the compound being sufficiently elastic, also permit the tubes to adjust themselves in the box for expansion and contraction due to changes in temperature.

The box B has an outwardly-extending flange C around its upper edge, which is cast with a groove channel or chamber on its upper side for receiving asphaltum. The cover of the box (not shown) rests upon this flange and is secured thereto by bolts. The cover has flanges projecting into the chambered opening B' and others projecting into the chambered flange. This chambered flange is also a feature employed by me in all underground boxes, and serves to exclude moisture from the connections by means of a joint readily separated when desired.

For additional protection from moisture and to insure the insulation of the parts, the body of the box itself may be filled with asphaltum, tar, or some compound thereof. This may be done after the cover of the box is secured in position by means of openings closed by screw-plugs.

For coupling the ends of two sets of main conductors placed at right angles to each other, Fig. 2, I employ bent copper pieces $d\,d'$, having eyes and set-screws like the similar parts of $a\,a'$. The pieces $d\,d'$ are, however, of different shape from $a\,a'$, and are different from each other, $d$ connecting the nearest conductors, while $d'$ is longer and connects the ends of the conductors separated the greatest distance from each other. These pieces $d\,d'$ serve to take up the expansion and contraction of the conductors. The elbow-box D, Fig. 2, which surrounds these connections, has chambered openings at right angles to each other and a chambered flange, and is in other respects similar to the simple coupling-box. The elbow-connection and box are used, principally, with the outside conductors of a district and with feeding circuits.

A T-coupling and box are shown in Fig. 6. These are used for connecting a continuous line of main conductors of an intermediate point with the end of another line of main conductors. Three sections $A^2$ are brought together. The two sets of conductors in line are connected by bent pieces $e\,e'$, having bent arms $e^2\,e^3$ extending to the third set of conductors. All the main conductors being in the same horizontal plane, the pieces $e\,e^2\,e'\,e^3$ are bent to avoid touching each other. They also take up expansion and contraction.

The T-box E has three chambered openings for the sections of tubing, and is substantially triangular in shape. This T construction is used for coupling cross-mains with the outside mains of a district supplied from a central station.

The street-mains of my system cross each other at intersecting streets, and have the positive and negative conductors, respectively, connected together, the whole forming two net-works of connected conductors. This is accomplished by means of the cross-connections and boxes shown in Fig. 4. For this form of connection four sections $A^2$ of tubing with projecting copper-rod conductors are brought together. The positive conductors A are connected by a four-arm spider $f$, and the negative conductors A' by a similar spider $f'$. These spiders have bent arms, so as to avoid each other and to take up expansion and contraction, each arm being provided with an eye or socket, and being secured to its conductor by a set-screw and by soldering the same, as already described with regard to the bent pieces $a\,a'$. The box F for inclosing these cross-connections has four chambered openings B' to receive the ends of tubing-sections $A^2$, and is made of a shape especially adapted to inclose these connections, but in other respects is similar to the simple line-coupling box B.

The feeding-circuits for supplying the system run out from the central station and are connected with the street-mains at various points, as is now well understood. The conductors for these feeding-circuits are also copper rods inclosed in sections of tubing; but the rods and tubes are larger than those of the main street-circuits. Such feeding-conductors are shown at G G' and the inclosing-tubes at $G^2$. Some or all of the feeding-conductors may be connected with the street-main conductor at points where they intersect and are connected. Connections for this purpose and inclosing-box are shown in Fig. 5. Four sets of street-main conductors are brought together, and laid parallel with one of such sets is a set of feeding-conductors. The positive conductors of all these sets of conductors are connected together by a five-arm spider $g$, and the negative conductors by another five-arm spider $g'$, the arms of these spiders being bent and provided with eyes or sockets. The eyes or sockets of the fifth arms of the spiders $g$ and $g'$ are larger than those of the other arms, to accommodate the larger or feeding conductors. The box H for inclosing these connections has four chambered openings B' arranged opposite, as in the simple cross-boxes shown in Fig. 4, and fifth chambered opening $B^2$, which is similar to the openings B', but is of larger size. The ends of tubing-sections $A^2$, from which project the street-main conductors, rest in the opening B', while the end section $G^2$ of the feeding-conductors rests in openings $B^2$.

The conductors of some or all of the feeding-circuits may be connected with the street-main conductors at points intermediate between the cross-boxes. The connections for this purpose are shown in Figs. 7 and 8. At the junction of two sections of the street mains terminate the feeding-conductors, which are laid parallel with the street-mains. The projecting bare street-mains enter eyes or sockets $h$ in connecting-pieces $i\,i'$. These connecting-pieces project laterally from the street-mains and have at their other ends larger eyes or sockets $h'$ for receiving the ends of the feeding-conductors. The box I for inclosing these connections is shown in Fig. 7. It has two chambered openings B', located opposite each other, and a chambered opening $B^2$ for the feeding-conductors, placed at one side of and parallel with one of the openings B'.

For making connection of the street-mains with the multiple-arc circuits of a house, the service connections and box shown in Fig. 3 are provided. For these connections the bare ends of the street-mains are joined by curved pieces $m\,m'$. Curved piece $m$ has a short slotted projection $n$, while $m'$ has an arm $n'$ extending down under piece $m$ and upon the outside of the same, the end of such arm $n'$ being slotted. The conductors O O', leading into a house, are the same as the street-main conductors, but are smaller, and they are inclosed in smaller tubing $O^2$. The bare ends of the house-conductors are placed in the slots of $n$ and $n'$, and the fingers forming the sides of the slots are pinched on such conductors. The junctions may also be soldered to secure better electrical contact. The box P for inclosing these connections has two chambered openings B' for the street-mains and another chambered opening $B^3$ for the tubing carrying the house-conductors.

While the positive and negative conductors are shown as inclosed in the same tube, it is evident that they may be carried by separate tubes, as set forth in my application, Serial No. 43,163, filed October 4, 1881. The connections would not be changed, and the only change that would be required in the inclosing-boxes is the provision for the entrance of twice the number of tubes.

What I claim is—

1. The combination, with insulated electrical conductors inclosed in tubes, of boxes joining the tube-sections, the joints between the boxes permitting expansion and contraction of the tubes, substantially as set forth.

2. The combination, with insulated electrical conductors inclosed in tubes, of boxes joining the tube-sections and having chambered openings receiving said tubes, whereby expansion and contraction of the tubes are permitted, substantially as set forth.

3. The combination, with covered underground conductors, of boxes for inclosing connections having chambered openings through which the conductors pass, such openings holding a moisture-excluding compound, substantially as set forth.

4. The combination of insulated electrical conductors inclosed in tubes, boxes joining the tubes and within which the conductors of different tubes are connected together, joints between the tubes and boxes, permitting expansion and contraction of the tubes, and connections between the conductors, permitting expansion and contraction thereof, substantially as set forth.

5. The combination of insulated electrical conductors inclosed in tubes, boxes joining said tubes, within which the conductors are bared for connections, and insulating material filling the boxes so as to cover the bared conductors and their connections, substantially as set forth.

6. The combination of insulated electrical conductors inclosed in tubes, boxes joining said tubes, expansible connections between conductors within said boxes, and an elastic insulating compound filling said boxes so as to cover the conductors and connections therein, substantially as set forth.

7. The combination of insulated electrical conductors inclosed in tubes, boxes joining said tubes, within which the conductors are laid bare for connection together, and a moisture-proof insulating compound of the character described filling said boxes so as to cover the connections, substantially as set forth.

8. The combination of insulated electrical conductors inclosed in tubes, boxes joining said tubes, within which the conductors are connected together, insulating material filling the boxes so as to cover the connections between the conductors, and connections between the tubes and boxes, permitting the expansion and contraction of the tubes, substantially as set forth.

9. The combination of insulated electrical conductors inclosed in tubes, boxes joining said tubes and so connected as to permit expansion and contraction of the tubes, expansible connections between the conductors within the boxes, and insulating material filling the boxes so as to cover the connections between the conductors, substantially as set forth.

This specification signed and witnessed this 5th day of December, 1881.

T. A. EDISON.

Witnesses:
 H. W. SEELY,
 WM. H. MEADOWCROFT.